(12) United States Patent
Takahashi

(10) Patent No.: US 9,225,270 B2
(45) Date of Patent: Dec. 29, 2015

(54) CURRENT CONTROL DEVICE OF SYNCHRONOUS MOTOR

(71) Applicant: FANUC Corporation, Yamanashi (JP)

(72) Inventor: Kenji Takahashi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/332,887

(22) Filed: Jul. 16, 2014

(65) Prior Publication Data

US 2015/0022127 A1 Jan. 22, 2015

(30) Foreign Application Priority Data

Jul. 18, 2013 (JP) .................... 2013-149711

(51) Int. Cl.
*H02P 21/00* (2006.01)
*H02P 6/00* (2006.01)
*H02P 21/10* (2006.01)
*H02P 6/10* (2006.01)

(52) U.S. Cl.
CPC ............. *H02P 6/002* (2013.01); *H02P 21/10* (2013.01); *H02P 6/10* (2013.01); *H02P 21/0089* (2013.01)

(58) Field of Classification Search
CPC ..... H02P 21/06; H02P 21/0089; H02P 21/10; H02P 21/0035; H02P 2207/05; H02P 6/002
USPC .................. 318/400.01, 400.02; 307/151; 363/1–12, 150
See application file for complete search history.

(56) References Cited

U.S. PATENT DOCUMENTS

2012/0153881 A1* 6/2012 Parenti ............... H02P 21/0089
318/400.02

FOREIGN PATENT DOCUMENTS

| JP | 8-275599 A | 10/1996 |
|---|---|---|
| JP | 2000-116198 A | 4/2000 |
| JP | 2000-341990 A | 12/2000 |
| JP | 2003-052199 A | 2/2003 |
| JP | 2006-20397 A | 1/2006 |
| JP | 4045307 B | 2/2008 |

* cited by examiner

*Primary Examiner* — Bentsu Ro
*Assistant Examiner* — Zemenay Truneh
(74) *Attorney, Agent, or Firm* — Hauptman Ham, LLP

(57) ABSTRACT

A current control device of a synchronous motor comprises a provisional d-phase current command calculation unit; a voltage amplitude calculation unit calculating a magnitude of a voltage command vector in a previous sampling period; a voltage ratio calculation unit determining a voltage ratio between the magnitude of the voltage command vector and a maximum output voltage of an amplifier; a target d-phase current calculation unit obtaining a d-phase current command in the previous sampling period, and calculating a target d-phase current command from the voltage ratio and the d-phase current command; a correction value calculation unit determining a correction value by passing a difference between the provisional d-phase current command and the target d-phase current command through a low-pass filter; and an adder adding the correction value to the d-phase current command in the present sampling period to calculate a new d-phase current command.

5 Claims, 11 Drawing Sheets

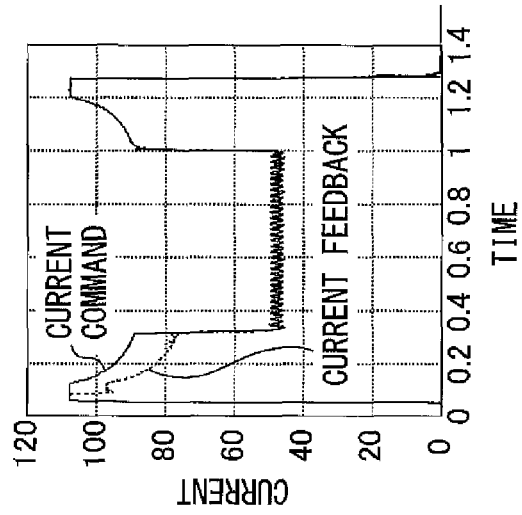
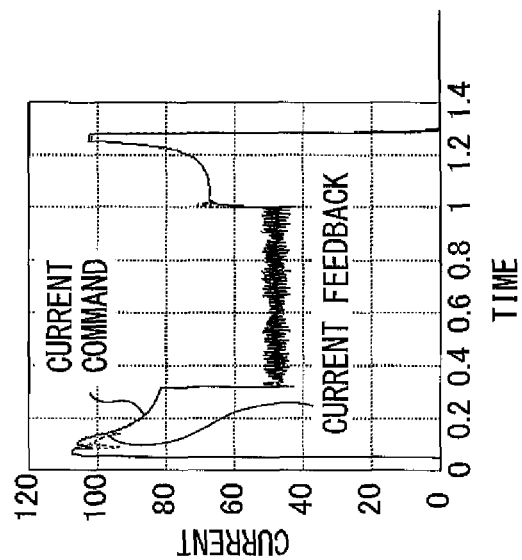
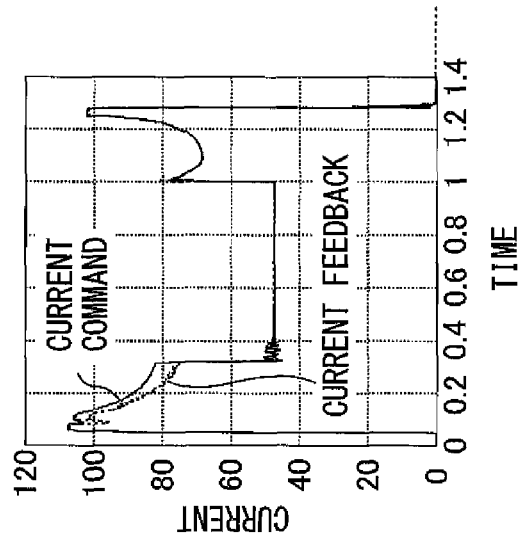

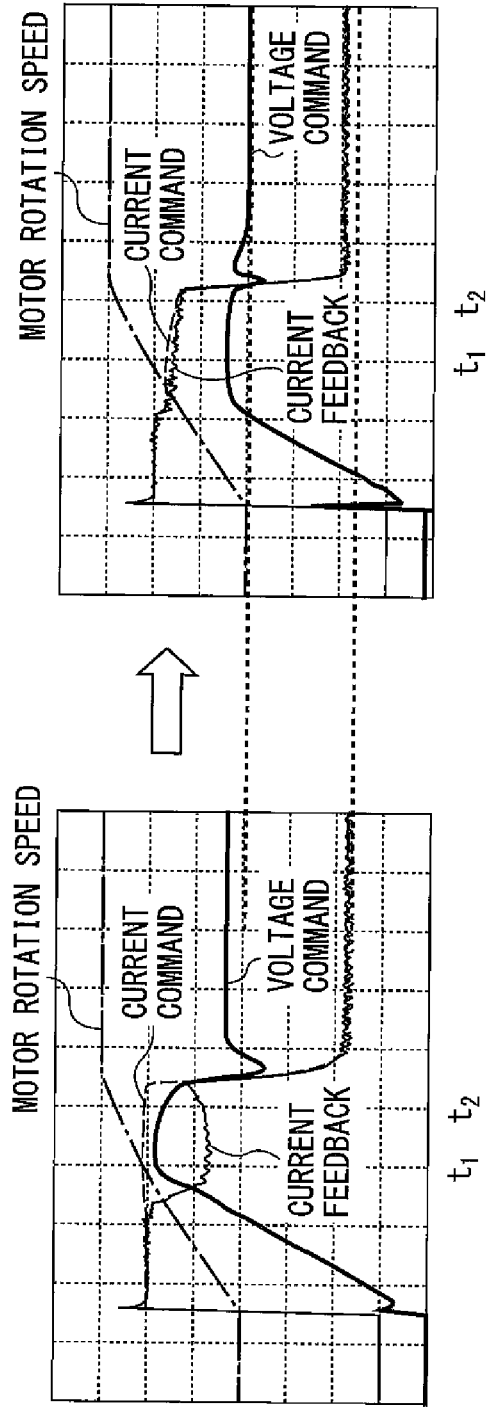

<PRIOR TO CORRECTION>

<AFTER CORRECTION>

CURRENT CONTROL DEVICE OF SYNCHRONOUS MOTOR

CROSS-REFERENCE TO RELATED APPLICATIONS

This application is a new U.S. patent application that claims benefit of JP 2013-149711, filed on Jul. 18, 2013, the entire content of JP 2013-149711 is hereby incorporated by reference.

FIELD OF THE INVENTION

The present invention relates to a current control device of a synchronous motor, and in particular to a current control device of a synchronous motor performing optimum field weakening by correcting a current command.

BACKGROUND OF THE INVENTION

In a permanent magnet synchronous motor (hereinafter simply referred to as "motor") driven by a current amplifier (hereinafter simply referred to as "amp"), the maximum values for current and voltage are limited by the constraints of the amp. In order to obtain maximum output under current and voltage limiting, it is preferable to perform optimum current vector control.

In a current vector control wherein a motor is controlled on the basis of an orthogonal dq coordinate system, when the motor is driven in a high-speed range in which a motor electromotive force surpasses the maximum voltage of the amp, a reactive d-phase current is applied in order to bring a motor terminal voltage to be less than the maximum voltage of the amp. By performing field weakening by applying the d-phase current in a current control (including current command generation), an increase of the motor terminal voltage due to a speed increase is inhibited, and the stable output operation range can be expanded. However, when the d-phase current is not adequately controlled, an increase of the d-phase current may lead to heat generation of the motor, and a shortage of the d-phase current may lead to voltage saturation. In other words, a voltage across motor terminals is limited by the maximum voltage which the amp can output, whereby a current control may become unstable.

In order to prevent this situation, methods have been proposed wherein the d-phase current is adequately applied corresponding to a motor load (in reality a torque command) (see, e.g., Japanese Unexamined Patent Publication No. JP-A-2003-052199 (hereinafter called "Patent Literature 1")). Specifically, the optimum d-phase current at no load, and the optimum d-phase current at maximum load are calculated and used to calculate q-phase and d-phase current commands corresponding to the load (see Formulas (16) and (17) of Patent Literature 1). In this case, the difference between no load and maximum load is determined by a primary linear approximation, so that an excessive d-phase current might flow. Therefore, in this conventional art, a voltage command, which is the output of the current control, is further used to adjust a speed (base speed) that is the reference for starting the application of the d-phase current, thereby improving the excessive state of d-phase current, and inhibiting heat generation of the motor (see FIG. 3 of Patent Literature 1).

However, in this conventional art, a problem occurs in motors wherein the short-circuit current determined by the ratio of the magnet's main magnetic flux and inductance is smaller than the maximum current of the amp; the problem is that the d-phase current for performing maximum torque/magnetic flux control may not be correctly applied, when maximum output control is performed by considering solely the voltage limiting during a high-speed operation of the motor. In this case, "maximum torque/magnetic flux control" is a method in a synchronous motor equipped with magnets wherein the phase difference between the q-phase current and the d-phase current is controlled such that the total magnetic flux, which corresponds to the motor terminal voltage upon application of an armature current corresponding to the preferable torque, is minimized.

On the other hand, methods have been proposed to prevent destabilization of current control due to voltage saturation wherein the q-phase current command is corrected on the basis of the result of proportion and integral of the error between the voltage command and a reference value (see, e.g., Japanese Unexamined Patent Publication No. JP-A-2000-341990). However, while stability during voltage saturation is improved in this conventional art, no consideration is given to the application of an optimum d-phase current and q-phase current corresponding to the motor speed, and therefore, an optimum current control is not performed.

Further, methods have been proposed wherein the d-phase current command is determined by a simple formula using the torque command, and is used to correct the q-phase current command (see, e.g., Japanese Patent Publication No. JP-4045307). An optimum current can be hereby applied, and a maximum torque control can be realized. However, no consideration is given to voltage saturation in this conventional art, so that such a problem occurs when an optimum current control may not be performed in the high-speed range. Further, since the exact values for the motor constants are preferable in the simple formula, there are problems of stability when constants fluctuate.

The present invention proposes a current control device of a synchronous motor wherein a voltage command being the output of the current control is used to correct the d-phase current command in order to adequately perform field weakening in the high-speed range (voltage saturation range) in the current control.

SUMMARY OF THE INVENTION

A current control device of a synchronous motor according to one embodiment of the present invention is a current control device of a synchronous motor, generating a current command in a predetermined sampling period on the basis of an orthogonal dq coordinate system, and the current control device includes a provisional d-phase current command calculation unit calculating a provisional d-phase current command on the basis of a torque command, a current at no load, and a current at maximum load; a voltage amplitude calculation unit obtaining a voltage command vector, which is an output of a current control in such a previous sampling period as is one cycle prior to the present sampling period, and calculating a magnitude of the voltage command vector; a voltage ratio calculation unit determining a voltage ratio between the magnitude of the voltage command vector and a maximum output voltage of the amplifier; a target d-phase current calculation unit obtaining a d-phase current command in the previous sampling period, and calculating a target d-phase current command from the voltage ratio and the d-phase current command; a correction value calculation unit determining a correction value by passing a difference between the provisional d-phase current command in the present sampling period and the target d-phase current command through a low-pass filter; and an adder adding the correction value to the d-phase current command in the present sampling period to calculate a new d-phase current command.

According to the present invention, an optimum field weakening can be performed without being influenced by fluctuations of a power source voltage, fluctuations of motor constants, or the like.

DESCRIPTION OF THE DRAWINGS

These and other features and advantages of the present invention will be better understood based on the following detailed description, taken together with the drawings wherein:

FIG. 7A is a graph depicting temporal changes of current command and current feedback during acceleration/deceleration when the time constant is changed;

FIG. 7B is a graph depicting temporal changes of current command and current feedback during acceleration/deceleration when the current command is corrected by a time constant of 2 [msec];

FIG. 7C is a graph depicting temporal changes of current command and current feedback during acceleration/deceleration when the current command is corrected by a time constant of 4 [msec];

FIG. 8A illustrates a state of divergence between current command and current feedback before the current command is corrected, when the voltage is insufficient;

FIG. 8B illustrates a state of divergence between current command and current feedback after the current command is corrected, when the voltage is insufficient;

DETAILED DESCRIPTION OF THE PREFERRED EMBODIMENT

Figure 1:
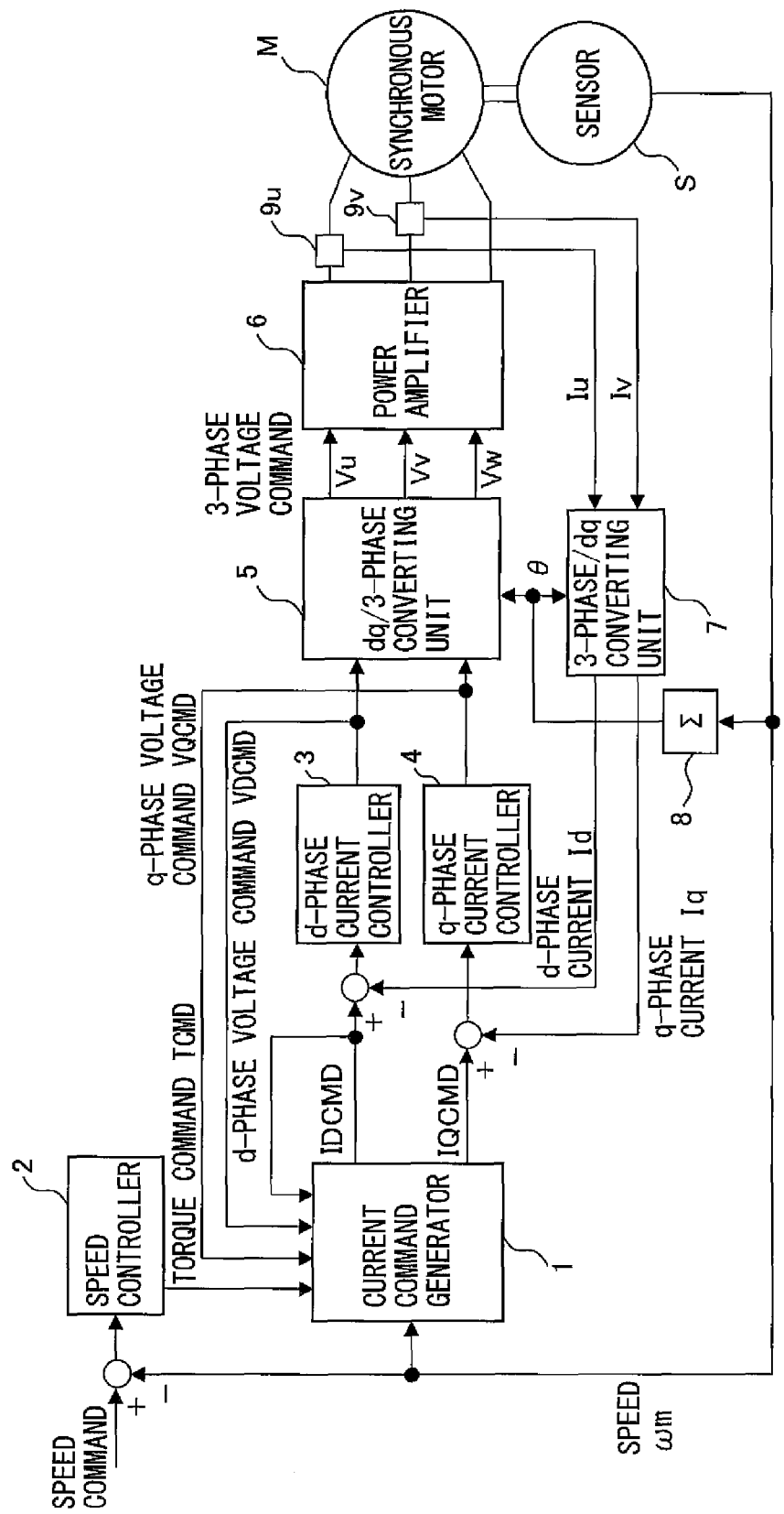
FIG. 1 is a block diagram of a current control device of a synchronous motor according to a first embodiment of the present invention.

In the following, the current control device of a synchronous motor according to the present invention is described referring to the drawings. However, the technical scope of the present invention is not limited to the embodiments and can be extended to the invention mentioned in the scope of the claims, and its equivalents.

Embodiment 1

FIG. 1 depicts a current control device of a synchronous motor according to a first embodiment of the present invention. The current control device of a synchronous motor according to the present invention comprises a current command generator 1, a speed controller 2, a d-phase current controller 3, a q-phase current controller 4, a dq/3-phase converting unit 5, a power amplifier 6, a 3-phase/dq converting unit 7, and an integration counter 8. The feature of the present invention lies in the current command generator 1. However, the configuration of the current control device of the synchronous motor is described first.

The speed controller 2 subtracts, from a speed command, a detected speed ωm from a sensor S detecting a rotation speed and a rotation position of a synchronous motor M, to determine a speed error, performs such speed loop processing on the basis of the speed error as proportion and integral, and calculates a torque command TCMD.

On the basis of the torque command TCMD, the detected speed ωm, a d-phase voltage command value VDCMD, a q-phase voltage command value VQCMD, and a d-phase current command value $IDCMD_0$ in a previous cycle (one trial earlier), the current command generator 1 determines a d-phase current command value IDCMD and a q-phase current command value IQCMD in a present cycle.

The d-phase current controller 3 and the q-phase current controller 4 respectively subtract a d-phase current Id and a q-phase current Iq respectively fed-back from the d-phase current command value IDCMD and the q-phase current command value IQCMD to determine a current error, perform such current loop processing as proportion and integral on the basis of the current error, and calculate a d-phase voltage command value VDCMD and a q-phase voltage command value VQCMD, respectively.

The dq/3-phase converting unit 5 converts the d-phase voltage command value VDCMD and the q-phase voltage command value VQCMD from a dq-phase to three phases, thereby converting to the voltage commands Vu, Vv and Vw of the three phases U, V and W, and controls the driving of the synchronous motor M via the power amplifier 6.

The current detectors 9u and 9v detect current of two phases (the currents Iu and Iv of the U-phase and the V-phase in the example illustrated in the drawings) within the 3-phase current flowing to the synchronous motor M.

The 3-phase/dq converting unit 7 converts a 3-phase current to a dq-phase current on the basis of the two phase currents Iu and Iv within the 3-phase current, and thereby calculating the d-phase current Id and the q-phase current Iq, and feeds them back.

The integration counter 8 detects a rotor rotation position of the synchronous motor M from signals detected by a sensor S that observes the position/speed of the synchronous motor M. The rotor rotation position is detected by the integration counter 8 and output to the dq/3-phase converting unit 5 and the 3-phase/dq-phase converting unit 7.

In the above-mentioned current control device of a synchronous motor, the feature of the present invention lies in the current command generator 1, while other elements are similar to a conventional current control device of synchronous motor that performs control by dq conversion.

Figure 2:
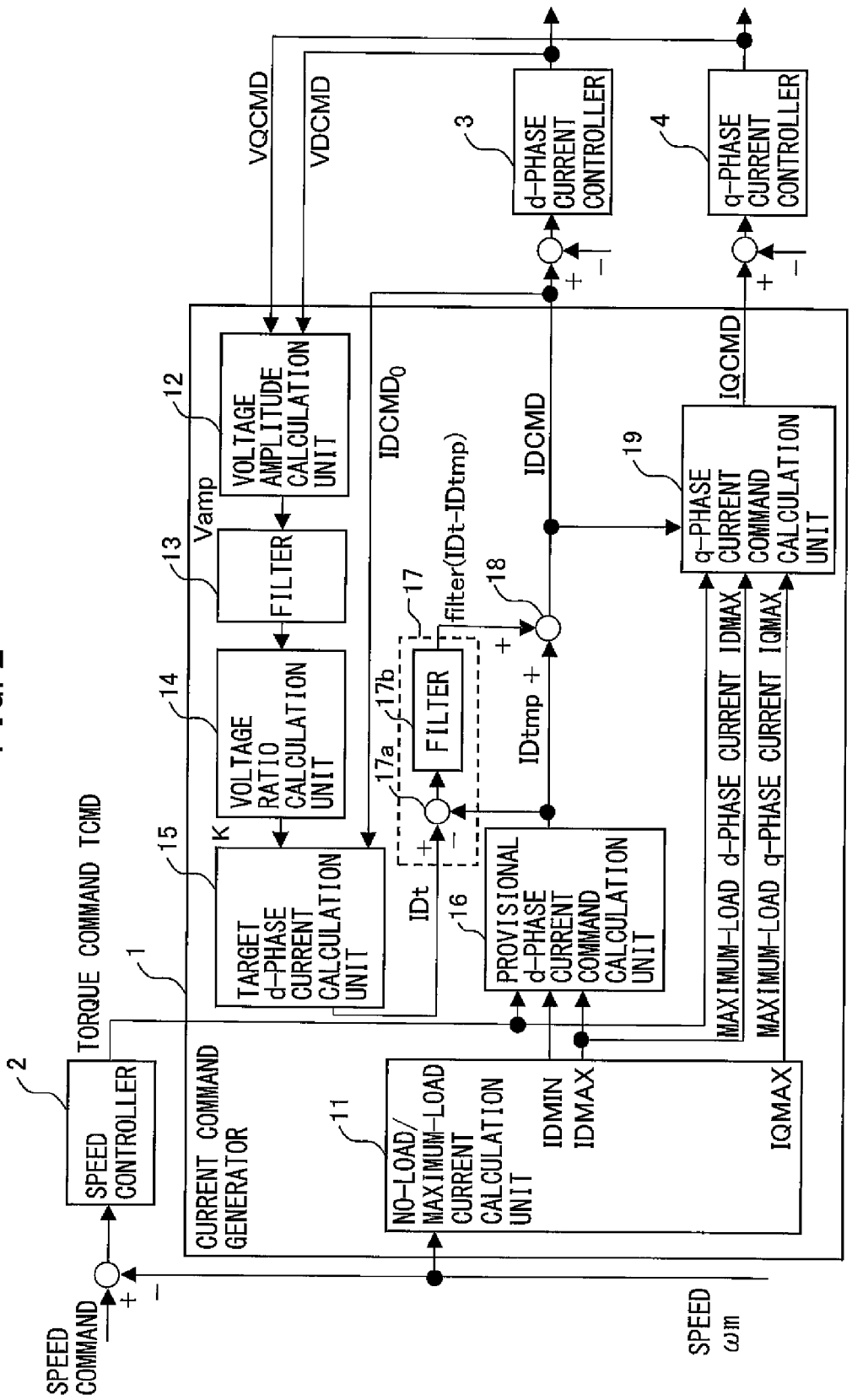
FIG. 2 is a block diagram of a current command generator comprised in the current control device of the synchronous motor according to the first embodiment of the present invention.

Next, a current command generator comprised in the current control device of a synchronous motor according to the first embodiment of the present invention is described. FIG. 2 is a block diagram of the current command generator 1 comprised in the current control device of a synchronous motor. The current command generator 1 according to the first embodiment is provided with a provisional d-phase current command calculation unit 16, a voltage amplitude calculation unit 12, a voltage ratio calculation unit 14, a target d-phase current calculation unit 15, a correction value calculation unit 17, and an adder 18.

The provisional d-phase current command calculation unit 16 calculates a provisional d-phase current command value IDtmp on the basis of a torque command TCMD, and the no-load d-phase current IDMIN and the maximum-load d-phase current IDMAX calculated by the no-load/maximum-load current calculation unit 11.

The voltage amplitude calculation unit 12 obtains a voltage command vector, which is the output of the current control in the previous sampling period, and calculates the magnitude Vamp of the voltage command vector. The voltage amplitude calculation unit 12 may also remove a high frequency component of the obtained voltage command vector by using a filter 13, which is a low-pass filter.

The voltage ratio calculation unit 14 determines the voltage ratio K between the magnitude Vamp of the voltage command vector and the maximum output voltage Vref of the amp.

The target d-phase current calculation unit 15 obtains the d-phase current command value $IDCMD_0$ in the previous sampling period and calculates the target d-phase current command value IDt from the voltage ratio K and the d-phase current command value $IDCMD_0$.

The correction value calculation unit 17 is provided with a subtracter 17a and a filter 17b, which is a low-pass filter. The subtracter 17a calculates a difference $\Delta ID(=IDt-IDtmp)$ between the provisional d-phase current command value IDtmp in the present sampling period and the target d-phase current command value IDt, passes the difference $\Delta ID$ through the filter 17b, and determines the correction value "filter(IDt−IDtmp)".

The adder 18 adds the correction value filter(IDt−IDtmp) to the d-phase current command value IDtmp in the present sampling period to calculate a new d-phase current command value IDCMD.

Figure 3:
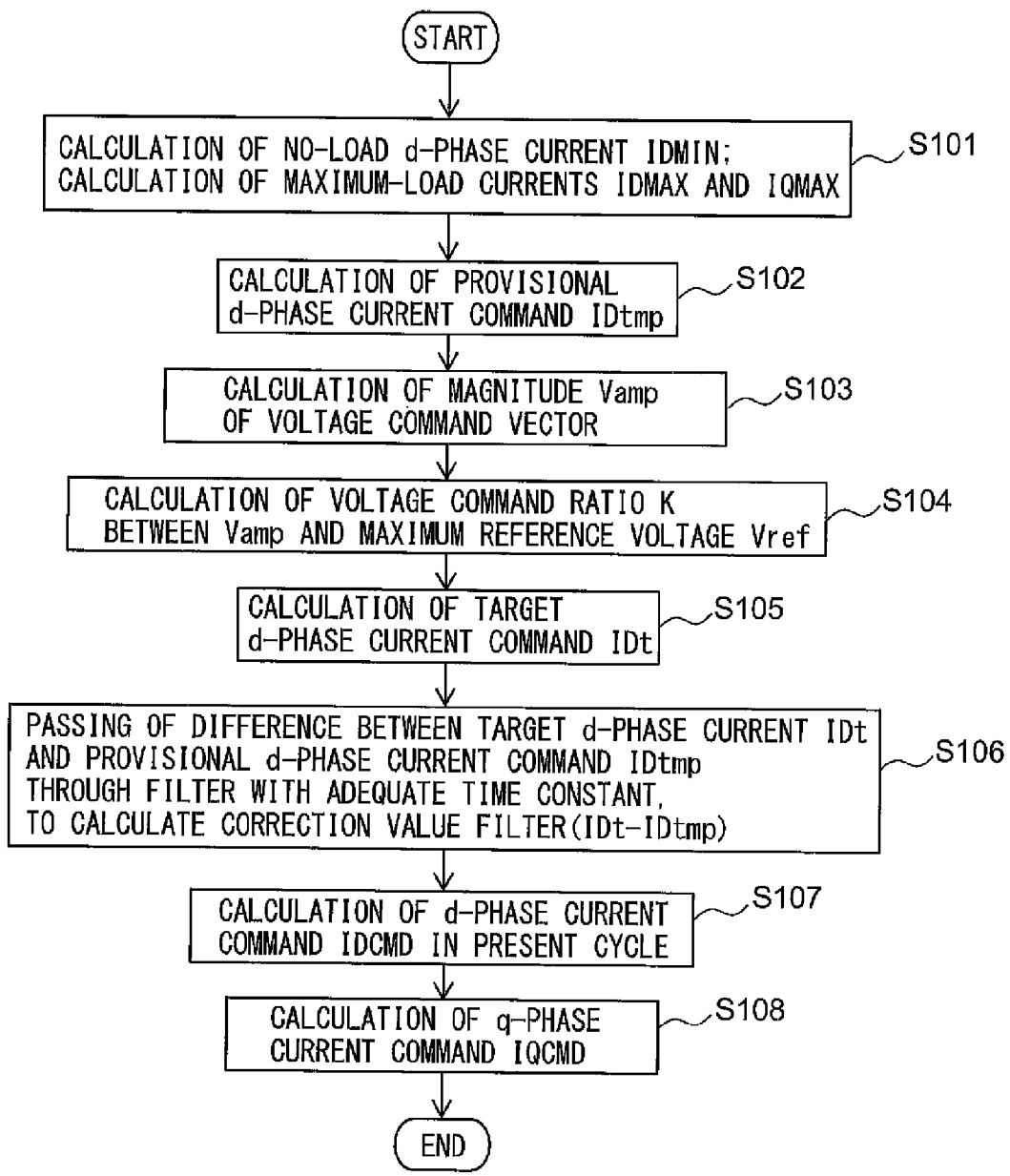
FIG. 3 is a flowchart illustrating a sequence for calculating d-phase current and q-phase current by the current control device of the synchronous motor according to the first embodiment of the present invention.

Next, an operation sequence of the current control device of a synchronous motor according to the first embodiment of the present invention is described. FIG. 3 is a flowchart depicting a sequence for calculating the d-phase current and the q-phase current by the current control device of a synchronous motor according to the first embodiment of the present invention.

Figure 4:
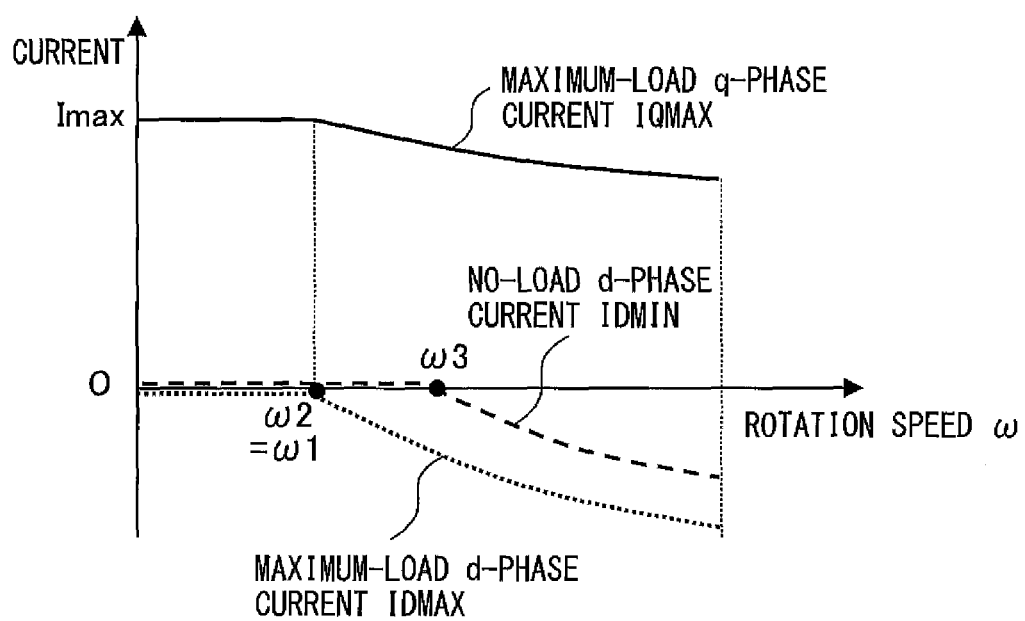
FIG. 4 is a chart illustrating the relationship of the current at no load and the current at maximum load with the motor rotation speed.

First, in Step S101, a no-load d-phase current IDMIN, a maximum-load d-phase current IDMAX, and a maximum-load q-phase current IQMAX of the synchronous motor are calculated. Examples of calculation of each current value are depicted in the graph in FIG. 4. The specific calculation method is as follows. Firstly, in a low-speed rotation range $(0<\omega<\omega 1)$ wherein the voltage to drive the motor is small, the maximum-load d-phase current IDMAX and the maximum-load q-phase current IQMAX are set to IDMAX=0 and IQMAX=IMAX, respectively. When the rotation speed ω is increased in this state, the command voltage reaches the maximum output voltage VMAX of the current control device of the synchronous motor at a certain rotation speed ω1. When the rotation speed is increased even more in this state, the output voltage becomes insufficient. In view of the above, when the rotation speed ω1 is set to d-phase current command start rotation speed at maximum load, and the motor rotation speed surpasses this rotation speed, the maximum-load d-phase current IDMAX and the maximum-load q-phase current IQMAX corresponding to the rotation speed are calculated by the following Formulas (1) and (2) respectively, so that the dq combined voltage value is fixed at VMAX, and the dq combined current value is fixed at IMAX.

$$IDMAX = 0.5 \cdot (\phi/L) \cdot [(IMAX/(\phi/L))^2 + 1] \cdot [(\omega 1/\omega)^2 - 1] \quad (1)$$

$$IQMAX = \sqrt{(IMAX^2 - IDMAX^2)} \quad (2)$$

where, ω is the electric angular velocity of the motor, φ is the main magnetic flux, and L is each of the inductances in d-axis direction and q-axis direction, (Ld=Lq=L).

Next, in Step S102, the provisional d-phase current command calculation unit 16 calculates the provisional d-phase current command value IDtmp on the basis of the torque command TCMD, and the no-load d-phase current IDMIN and maximum-load d-phase current IDMAX both of which calculated by the no-load/maximum-load current calculation unit 11. The calculation formula is shown in the following Formula (3).

$$IDtmp = IDMIN + (IDMAX - IDMIN) \cdot TCMD \quad (3)$$

Next, in Step S103, the voltage amplitude calculation unit 12 calculates the magnitude Vamp of the voltage command vector which is the output of the current control in the previous cycle. The calculation formula is shown in the following Formula (4).

$$Vamp = \sqrt{VDCMD^2 + VQCMD^2} \quad (4)$$

where, VDCMD and VQCMD are voltage commands for the d-phase and the q-phase in the previous cycle, respectively.

Next, in Step S104, the voltage ratio calculation unit 14 calculates the voltage command ratio K between the magnitude Vamp of the voltage command vector and the maximum reference voltage Vref which corresponds to the maximum output voltage of the amp. The calculation formula is shown in the following Formula (5).

$$K = Vref/filter(Vamp) \quad (5)$$

Here, filter(Vamp) means that high frequencies are removed by an adequate low-pass filter in order to reduce the influence of noise.

Figure 5A:
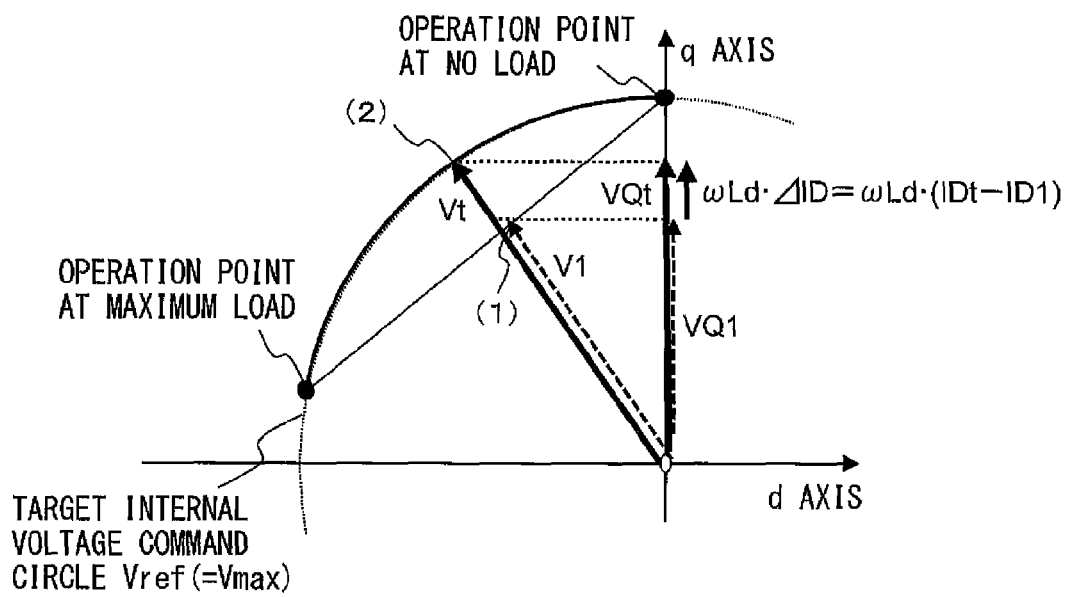
FIG. 5A is a chart depicting a sequence for calculating target current when voltage vector V1 satisfies V1<Vref.
Figure 5B:
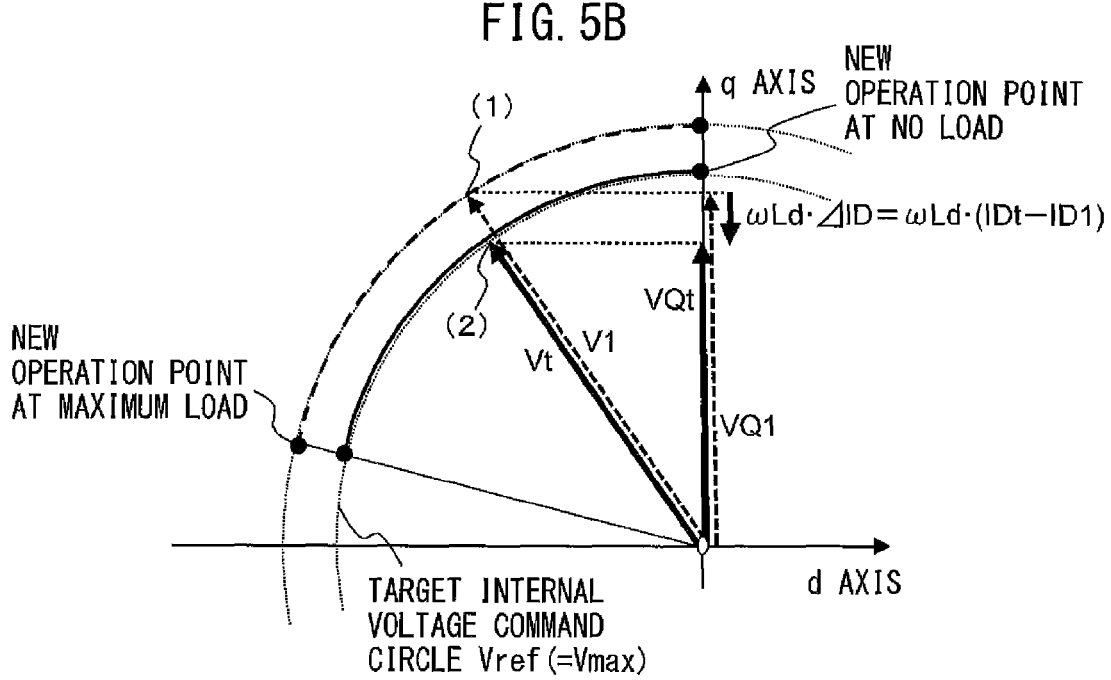
FIG. 5B is a chart depicting a sequence for calculating the target current when voltage vector V1 satisfies V1>Vref.

Next, in Step S105, the target d-phase voltage calculation unit 15 uses the d-phase current command value $IDCMD_0$ in the previous cycle to calculate a target d-phase current command value IDt. FIGS. 5A and 5B illustrate the method for generating the target d-phase current IDt. FIG. 5A illustrates the case of voltage vector V1<Vref, and FIG. 5B illustrates the case of voltage vector V1>Vref. Here, V1 is the voltage command in the previous cycle.

In FIG. 5A, when the operation point is moved from (1) to (2), the targeted d-phase current value IDt can be calculated by the following Formulas (6) and (7) on the basis of the ratio K between V1 and Vt (=Vref), and the d-phase current command value ID1 (=$IDCMD_0$) in the previous cycle.

$$K = \frac{Vref}{V1} = \frac{VQt}{VQ1} = \frac{\omega Ld \cdot IDt + \omega\phi}{\omega Ld \cdot ID1 + \omega\phi} \quad (6)$$

$$IDt = K \cdot ID1 + (K-1) \cdot \frac{\phi}{Ld} \quad (7)$$

In this case, let $ID1 = IDCMD_0$ and the short-circuit current $\phi/Ld = Isc$, the following Formula (8) is obtained.

$$IDt = K \cdot IDCMD_0 + (K-1) \cdot Isc \quad (8)$$

When a voltage in d-phase direction and a current in q-phase direction are considered in a similar manner, a targeted q-phase current command value IQt can be calculated by the following Formulas (9) and (10).

$$K = \frac{Vref}{V1} = \frac{VDt}{VD1} = \frac{-\omega Lq \cdot IQt}{-\omega Lq \cdot IQ1} \quad (9)$$

$$IQt = K \cdot IQ1 \quad (10)$$

Figure 6:
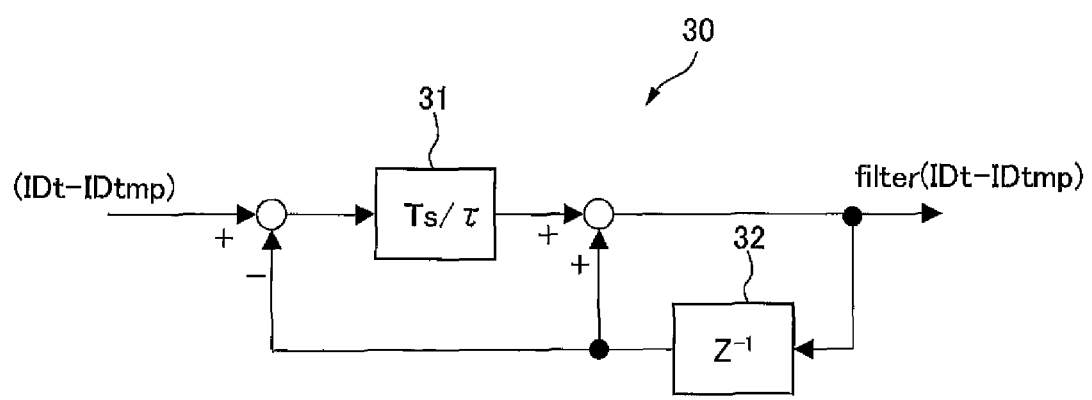
FIG. 6 is a block diagram of a filter used in the synchronous motor according to the first embodiment of the present invention.

Next, in Step S106, the correction value calculation unit 17 passes the difference ($\Delta ID = IDt - IDtmp$) between the target d-phase current IDt determined by the subtractor 17a and the above provisional d-phase current command value IDtmp through a filter 17b with an adequate time constant to calculate a correction value filter(IDt–IDtmp). As the filter 17b, for example, a primary low-pass filter 30 with a time constant $\tau$ as depicted in FIG. 6 can be used. In this case, the low-pass filter 30 determines the difference between a filter input (IDt–IDtmp) and a filter output filter(IDt–IDtmp) in the previous cycle which has passed a delayer 32. The determined difference is multiplied by a filter gain (Ts/$\tau$) 31, and the result is added to the filter output filter(IDt–IDtmp) in the previous cycle, the result of which is used as filter output filter(IDt–IDtmp) in the present cycle. In this case, Ts is the sampling time, and $\tau$ is the time constant.

Next, in Step S107, the adder 18 adds the correction value filter(IDt–IDtmp) to the provisional d-phase current command value IDtmp to calculate the d-phase current command value IDCMD in the present cycle. The calculation formula is shown in the following Formula (11).

$$IDCMD = IDtmp + \text{filter}(IDt - IDtmp) \quad (11)$$

The result is the d-phase current command value IDCMD in the present cycle. The role of the filter 17b is to determine the flow of the d-phase current IDCMD as to whether emphasis is put on the provisional d-phase current command value IDtmp coming from the command side (when the filter's time constant is infinity, IDtmp is set to 100%), or emphasis is put on IDt formed from the correction side so as to approximate the voltage command vector Vamp in the previous cycle to Vref in the present cycle (when the filter's time constant is 0, IDt is set to 100%). Further, when the time is sufficiently larger than the time constant of the filter, IDCMD is only IDt from the correction side that tries to apply a voltage as per Vref. As a result, there is a certain optimum value for the time constant of the filter 17b. Therefore, evaluations by simulations and by real machines are performed in advance to determine the optimum time constant, which is used. FIGS. 7A to 7C are graphs depicting temporal changes of a dq combined current command and a dq combined current feedback during acceleration/deceleration, when the time constant is changed. FIGS. 7A to 7C depict the case when no correction is made, the case when a correction is made by a time constant of 2 [msec], and the case when a correction is made by a time constant of 4 [msec], respectively. For example, as shown in FIG. 7B, a time constant of 2 [msec] is determined to be optimum value when the divergence between the dq combined current command (solid line) during acceleration/deceleration and the dq combined current feedback (broken line) is small.

Next, in Step S108, the q-phase current command value IQCMD is calculated. The calculation formula is shown in the following Formula (12).

$$IQCMD = \frac{[Isc - (Lq/Ld - 1)] \cdot IDMAX}{[Isc - (Lq/Ld - 1)] \cdot IDCMD} \cdot IQMAX \cdot TCMD \quad (12)$$

For the calculated d-phase current command value IDCMD and q-phase current command value IQCMD in the present cycle, current control such as proportion and integral is performed, and voltage commands for the d-phase and the q-phase are output. On the basis of the output voltage commands, the power amplifier 6 feeds a current to the synchronous motor M and drives the synchronous motor M.

The above voltage command ratio K illustrates to what extent the present voltage command Vamp needs to be increased or reduced in relation to the maximum reference voltage Vref which corresponds to the maximum voltage of the power amplifier 6. Provided that the d-phase current command value IDCMD is corrected according to the above Formula (11) corresponding to this ratio, maximum output control is always possible.

For example, when a voltage command that transiently surpasses the maximum reference voltage is output, the correction into the optimum d-phase current command promptly revises the voltage command. In this way, stability of the current control is improved. Further, when a voltage command which is smaller than the maximum reference voltage is output, large d-phase current flows more than necessary, which can be promptly revised by the correction into the optimum d-phase current command, and heat generation of the synchronous motor can be inhibited.

In this case, the feature of the current control device of a synchronous motor according to the first embodiment of the present invention is that the current command is corrected and transition is made to an optimum state and the optimum state is maintained, by configuring a feedback loop depending on the state of the voltage command.

The maximum reference voltage Vref is a value, for example 100%, that is normalized for the maximum voltage of the power amplifier 6, but it does not indicate a fixed voltage limiting value. Therefore, the optimum d-phase current command control of the present invention functions effectively, even if the power source voltage fluctuates.

For example, when the power source voltage decreases and the maximum output voltage of the power amplifier decreases, the corresponding maximum reference voltage Vref is fixed at 100%. However, since it is attempted to maintain the d-phase current prior to the decrease of the power source voltage by the function of current control loop, the command voltage Vamp normalized by the voltage of the power amplifier increases. As a result, the voltage command ratio K falls to 1 or below, which functions to increase Id and prevent voltage saturation. Thus, the current control does not become unstable.

Further, when the main magnetic flux decreases due to heat generation of the motor, the voltage command Vamp decreases, trying to maintain the d-phase current before the main magnetic flux decreased by the function of the current control loop. Therefore, the voltage command ratio K becomes 1 or more, which functions to decrease the d-phase current, so that heat generation of the motor can be inhibited.

Thus, the current control device of a synchronous motor according to the first embodiment of the present invention has the feature that it can be effective against fluctuations of the power source voltage and fluctuations of motor constants.

Next, effects of using the current control device of a synchronous motor according to the first embodiment of the present invention are described. FIGS. 8A and 8B illustrate changes in characteristics when the current command is corrected under a condition of an insufficient voltage. FIG. 8A depicts characteristics prior to the correction, and FIG. 8B depicts characteristics after the correction. By performing a correction, as can be remarkably seen between times t1 and t2, the current error, which is the divergence between the current command and the current feedback, is reduced.

Figure 9A:
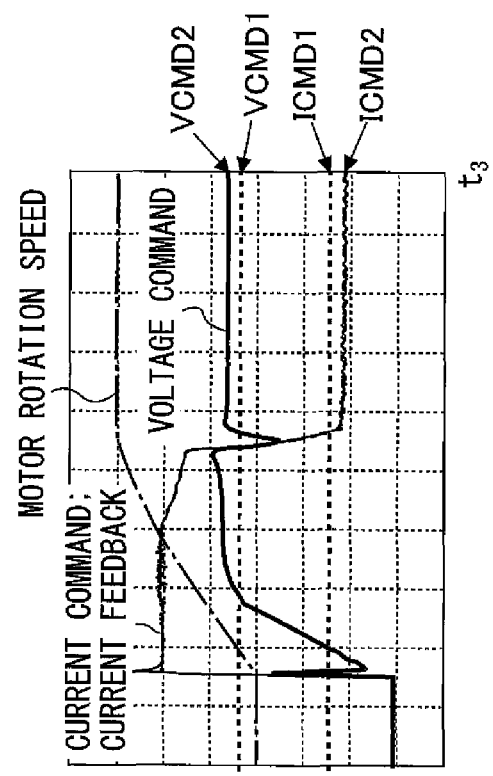
FIG. 9A depicts a characteristic of the voltage command before the current command is corrected, when the voltage is sufficient.
Figure 9B:
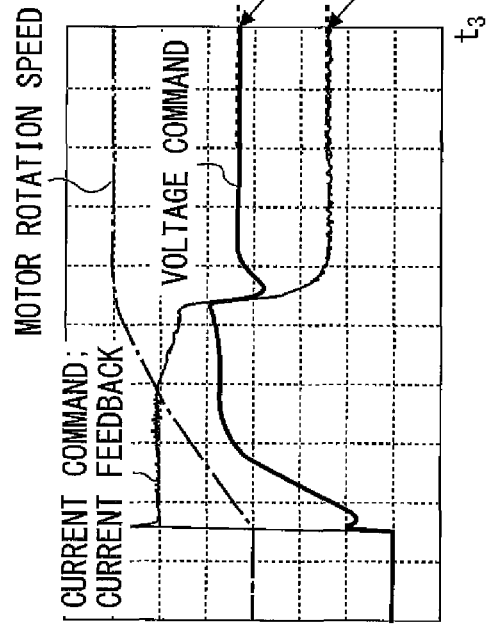
FIG. 9B depicts a characteristic of the voltage command after the current command is corrected, when the voltage is sufficient.

FIGS. 9A and 9B depict changes in characteristics when the current command is corrected under a condition of a sufficient voltage. FIG. 9A depicts characteristics prior to the correction, and FIG. 9B depicts characteristics after the correction. As can be remarkably seen from the characteristics at time t3, it is understood that the dq combined voltage command under a fixed rotation is increased from VCMD1 to VCMD2, and the dq combined current is reduced from ICMD1 to ICMD2 by performing a correction.

Embodiment 2

Next, a current control device of a synchronous motor according to a second embodiment of the present invention is described. Normally, a current command vector calculated by the current command generation unit is calculated by taking the maximum current of the amp into consideration. However, when the d-phase current command is changed by performing a correction by the current control device of a synchronous motor according to the first embodiment of the present invention, the magnitude of the current command vector may surpass the maximum current of the amp. In order to prevent this, the current control device of a synchronous motor according to the second embodiment uses IQCMD and the maximum current of the amp to limit the d-phase current command value IDCMD.

Figure 10:
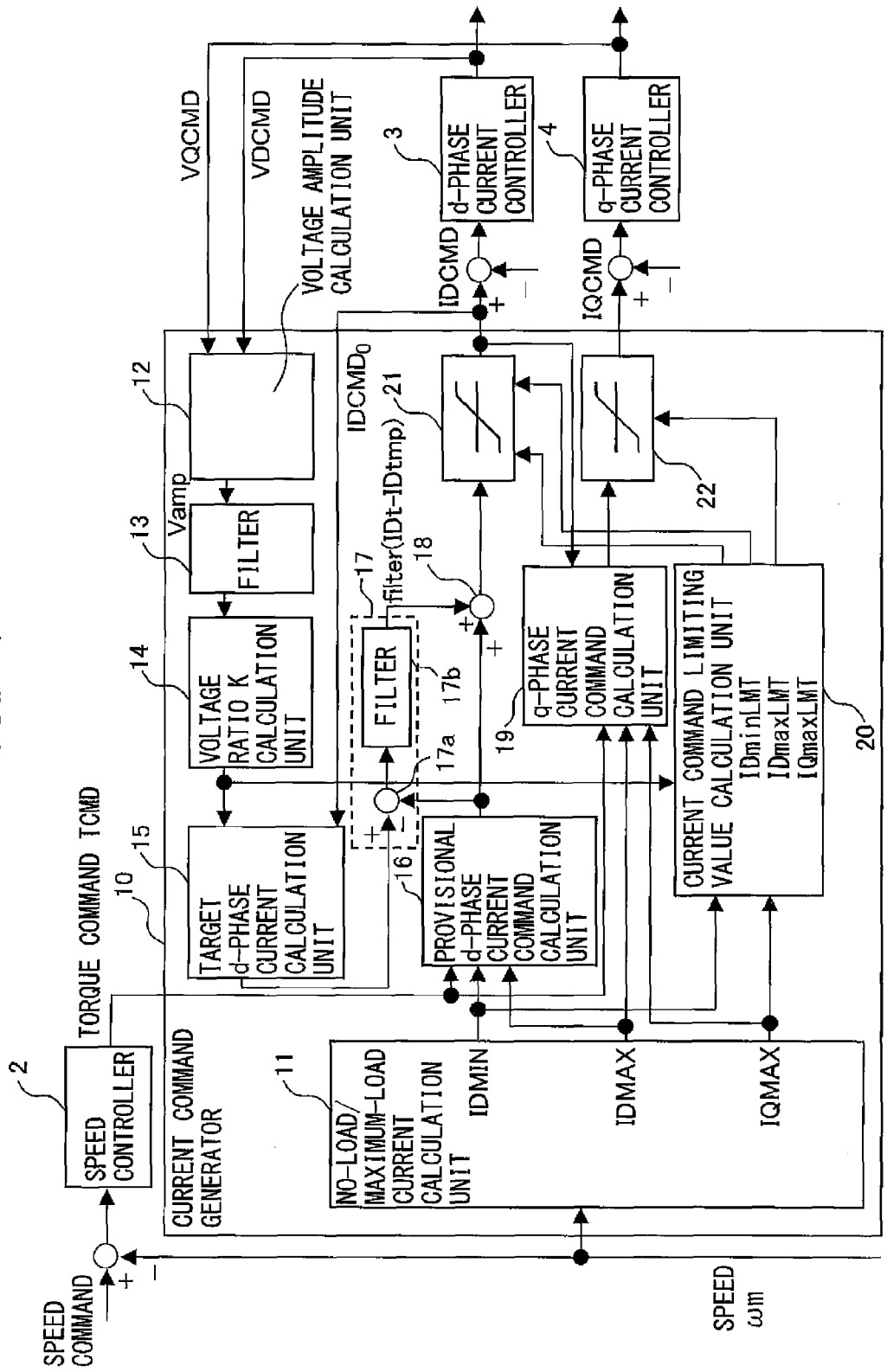
FIG. 10 is a block diagram of a current command generator comprised in the current control device of a synchronous motor according to a second embodiment of the present invention.

FIG. 10 illustrates the configuration of a current command generator 10 comprised in a current control device of a synchronous motor according to the second embodiment. The current command generator 10 according to the second embodiment differs from the current command generator 1 according to the first embodiment in that the current command generator 10 is further provided with a current command limiting value calculation unit 20 calculating the d-phase current command limiting value and the q-phase current command limiting value, and that the maximum value of the new d-phase current command value IDCMD is limited by $\sqrt{(\text{set maximum current})^2 - (\text{q-phase current command limiting value})^2}$. Another configuration is the same as or similar to the current command generator 1 according to the first embodiment, so that the detailed description is omitted.

The current command limiting value calculation unit 20 calculates d-phase current command limiting values IDminLMT and IDmaxLMT as well as a q-phase current command limiting value IQmaxLMT. The calculation method will be described later.

As a method for limiting the maximum value of the new d-phase current command value IDCMD by the d-phase current command limiting value and the q-phase current command limiting value, the current command generator 10 may, for example, be provided with a d-phase current limiter 21 and a q-phase current limiter 22.

Figure 11:
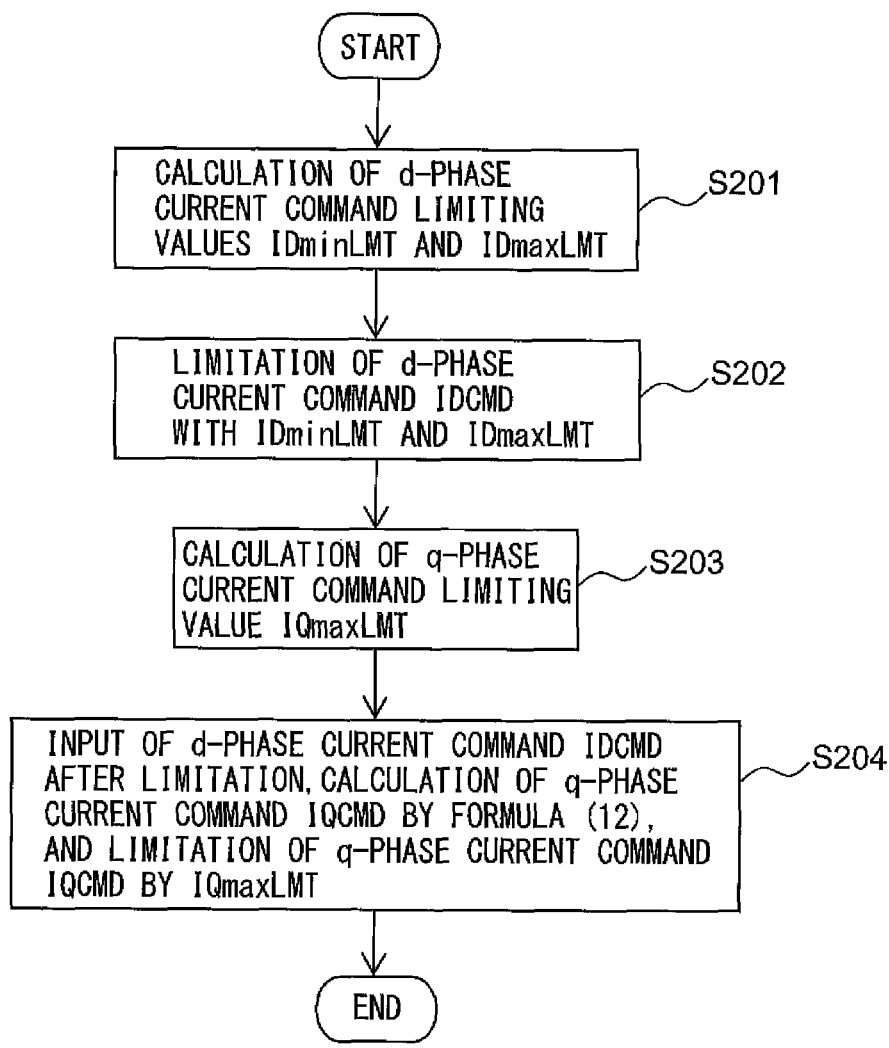
FIG. 11 is a flowchart depicting a sequence for limiting the d-phase current and the q-phase current by the current control device of a synchronous motor according to the second embodiment of the present invention.

Next, an operation sequence of a current command generator 10 according to the second embodiment is described. FIG. 11 is a flowchart describing the operation sequence of the current command generator 10 according to the second embodiment. Firstly, in Step 201, the d-phase current command limiting values IDminLMT and IDmaxLMT are calculated by the following Formulas (13) and (14).

$$ID\text{minLMT} = \min(K \cdot ID\text{MIN} + (K-1) \cdot Isc, 0)$$

$$ID\text{maxLMT} = \min(-\sqrt{I\text{max}^2 - (K \cdot IQ\text{MAX})^2}, ID\text{minLMT}) \quad (13, 14)$$

In this case, Imax is the set maximum current that can flow to the amp.

Next, in Step 202, the d-phase current command value IDCMD is limited by IDminLMT and IDmaxLMT by using a d-phase current limiter 21.

Next, in Step 203, the q-phase current command limiting value IQmaxLMT is calculated by the following Formula (15).

$$IQ\text{maxLMT} = \min(K \cdot IQ\text{MAX}, IQ\text{MAX}) \quad (15)$$

Next, in Step 204, the d-phase current command value IDCMD after limiting is used to calculate the q-phase current command value IQCMD by Formula (12), and the q-phase current command value IQCMD is limited by IQmaxLMT using a q-phase current limiter 22.

According to the current control device of a synchronous motor according to the second embodiment, the magnitude of the current command vector can be avoided to surpass the maximum current of the amp, even if the d-phase current command is corrected.

The correction described above of a current command value by the current control device of a synchronous motor according to the present invention is performed only in a high-speed range. In short, when neither a first condition by which the synchronous motor is at a no-load base speed or above, nor a second condition by which it is at the maximum-load base speed or above and also surpasses the magnitude of a predetermined voltage command vector, is met, the correction value is set to zero. Conditions for the high-speed range are that the synchronous motor is either at the no-load base speed or above, or that it is at the maximum-load base speed or above and also surpasses the magnitude of a predetermined voltage vector. When neither of these conditions is met, the above-described correction is not performed.

What is claimed is:

1. A current control device of a synchronous motor, generating a current command in a predetermined sampling period on the basis of an orthogonal dq coordinate system, the current control device comprising:

a provisional d-phase current command calculation unit calculating a provisional d-phase current command on the basis of a torque command, a current at no load, and a current at maximum load;

a voltage amplitude calculation unit obtaining a voltage command vector, which is an output of a current control in a previous sampling period, that is one cycle prior to the present sampling period, and calculating a magnitude of the voltage command vector;

a voltage ratio calculation unit determining a voltage ratio between the magnitude of the voltage command vector and a maximum output voltage of an amplifier;

a target d-phase current calculation unit obtaining a d-phase current command in the previous sampling period, and calculating a target d-phase current command from the voltage ratio and the d-phase current command;

a correction value calculation unit determining a correction value by passing a difference between the provisional d-phase current command in the present sampling period and the target d-phase current command through a low-pass filter; and an adder adding the correction value to the provisional d-phase current command in the present sampling period in order to calculate a new d-phase current command.

2. The current control device of a synchronous motor according to claim 1, further comprising a current command limiting value calculation unit calculating a d-phase current command limiting value and a q-phase current command limiting value, wherein a maximum value of the new d-phase current command is limited by $\sqrt{((\text{set maximum current})^2-(\text{the q-phase current command limiting value})^2)}$.

3. The current control device of a synchronous motor according to claim 1, wherein the voltage amplitude calculation unit removes a high frequency component of obtained voltage command vector by using a low-pass filter.

4. The current control device of a synchronous motor according to claim 1, wherein the target d-phase current calculation unit calculates the target d-phase current command on the basis of the following formula;

$$(\text{target } d\text{-phase current command}) = (\text{voltage ratio}) \times (\text{previous } d\text{-phase current command}) + (\text{voltage ratio} - 1) \times (\text{short-circuit current}).$$

5. The current control device of a synchronous motor according to claim 1, wherein when neither a first condition by which the synchronous motor is at a no-load base speed or above, nor a second condition by which the synchronous motor is at a maximum-load base speed or above and also surpasses a magnitude of a predetermined voltage command vector, is met, the correction value is set to zero.

* * * * *